March 8, 1932.  T. H. LYNG  1,848,367

ATTACHMENT FOR POTATO DIGGERS

Filed Oct. 12, 1929

Inventor

Toris H. Lyng

By

Attorney

Patented Mar. 8, 1932

1,848,367

UNITED STATES PATENT OFFICE

TORIS H. LYNG, OF GRANDVIEW, WASHINGTON

ATTACHMENT FOR POTATO DIGGERS

Application filed October 12, 1929. Serial No. 399,346.

This invention relates to machines for digging potatoes and has for its object to provide an attachment thereto, adapted to engage the side of the furrow made by such a machine and to push the potatoes toward the center of the machine. Another object is to provide a means for preventing the escape of potatoes from the sides of a potato digger. Another object is to provide such an attachment which will be cheap to make, easy to attach, and effective in use.

I attain these and other objects by the devices, mechanisms and arrangements illustrated in the accompanying drawings, in which—

Figure 1:
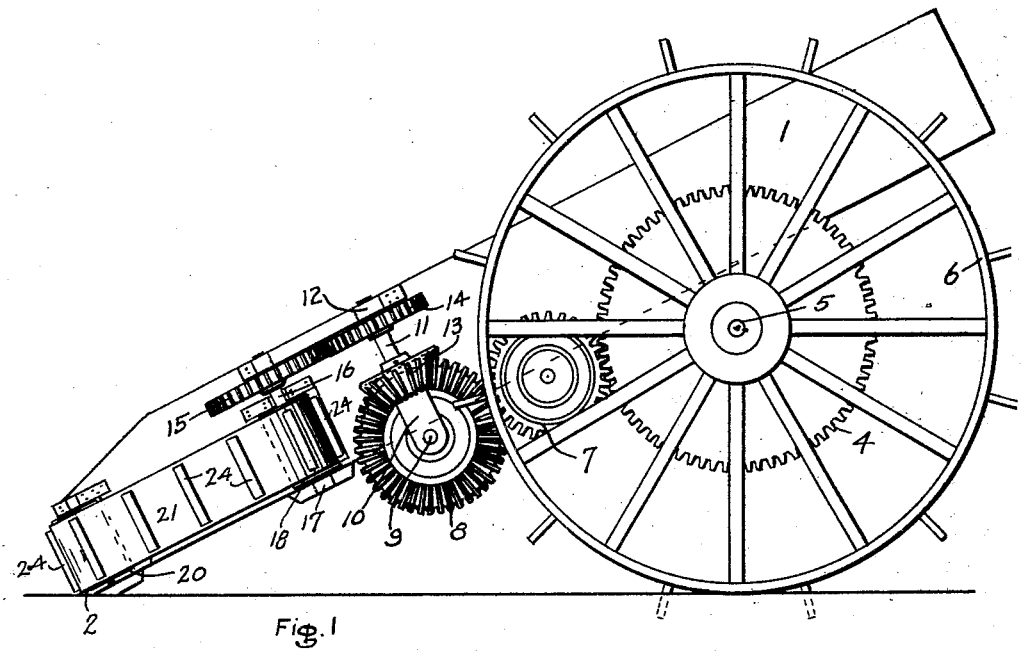
Figure 2:
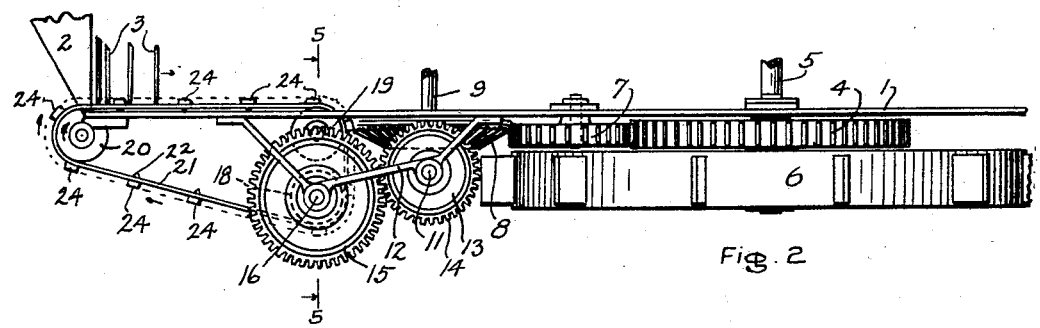
Figures 3, 4:
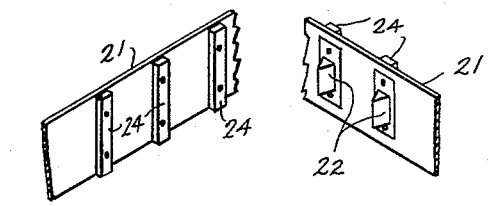
Figure 5:
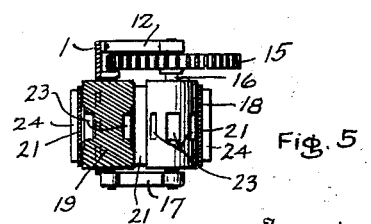

Fig. 1 is a side elevation of a potato digger, showing my improved attachment mounted thereon; Fig. 2 is a plan view of one side thereof; Fig. 3 is a perspective view of the outer side of a portion of the operating belt; Fig. 4 is a similar view of the inner side thereof; and Fig. 5 is a section thereof, taken on the line 5—5 in Fig. 2.

Similar numerals of reference refer to similar parts throughout the several views.

In the operation of a potato digger, it is observed that some potatoes escape the sides of the machine and are lost because they are covered over by the action of the machine, as it passes. It is the object of this invention to cause these potatoes to be pushed towards the center of the machine so that they will be picked up by the elevator thereof along with the other potatoes which are not near the edge of the furrow.

In the drawings I have shown only one side of the machine, it being understood that the other side thereof may either be identical with the side shown or may be run therefrom by means of the cross-shaft. The drawings also do not shown any of the operating parts of the potato digger, except as is necessary to illustrate my invention.

The potato digger comprises two side plates 1, suitably connected together in separated parallel positions, and carrying a plow 2 at their front end, and having an elevator between them. This elevator comprises suitable cross bars 3 secured to side chains, operated in the usual manner from a gear 4, mounted on and turning with the axle 5 of the main wheels 6, on which the machine is supported.

An idler gear 7 is mounted in front of the above described wheel 4 and meshes therewith. A bevel gear 8, which is formed with its teeth extending out from the disk, engages the idler gear 7 with the said ends of its teeth and is turned thereby. This bevel gear 8 is mounted on and secured to the shaft 9 extending across the machine and mounted in suitable bearings secured to the two plates 1. An outer bearing member 10 is mounted on the end of the shaft 9 and extends upward therefrom and forms the lower bearing for a vertical shaft 11, whose upper end is supported in a bearing mounted on a bracket 12, which is secured to and extends out from the plate 1 of the machine. This shaft 11 has a bevel gear 13 secured thereto, and is also provided with the straight-faced gear wheel 14 near its upper end. The said bevel gear 13 meshes with the above described bevel gear 8, and is driven thereby and drives the said gear wheel 14. The gear wheel 14 meshes with a similar gear wheel 15, mounted on a shaft 16 lying in a vertical plane. The shaft 16 is mounted in bearings on the said bracket 12 and on a lower bracket 17. The shaft 16 is also provided with a drum or roller 18, secured thereto, and provided with cavities therein, as hereinafter described. An opening is made in the side plate 1 of the machine at a point adjacent to this roller 18. A second and similar roller 19, is mounted in the opening thus formed, having its inner periphery extending slightly inward from the inner side of the said plate 1. This second roller 19 is mounted on a shaft suitably supported on bearings secured to the plate 1. Another and similar roller 20 is mounted adjacent the front end of the plate 1, the said plate being cut away therefor, to permit the inner periphery of the said roller 20 to extend slightly inward from the inner side of the plate 1. A belt 21, of suitable flexible material, and preferably about six inches wide, is mounted around the three rollers 18, 19 and 20. The inner side or surface of this belt 21 is provided with spaced lugs or teeth 22, adapted to engage in the complementary cavities 23 formed in all of the said rollers 18, 19 and 20, whereby the said belt 21 is driven and whereby it is held and maintained in vertical position on the said rollers 18, 19 and 20. The outer surface of this belt 21 is provided with potato-engaging cleats 24, which extend outward therefrom.

The belts 21 are imperforate and are without any openings therethrough to permit the potato vines to become entangled therewith, and thus interfere with the successful and continuous operation of the machine. As above stated, the shaft 16, and therefore the drum 18 mounted thereon, lies in a vertical plane. The axes of the other two pairs of drums 19 and 20 are also mounted on the frame to lie on substantially vertical planes.

It is evident then that when the potato digger is moved forward to dig the potatoes, the main wheels 6 thereof rotate and drive the successive gear wheels 4, 7, 8, 13, 14, and 15 to rotate the roller 18 and to actuate the belt 21 so that its outer surface travels forward. It is also evident that as this belt 21 turns around the forward roller 20 it moves toward the center of the machine and its cleats will therefore engage and push any potatoes, which otherwise would escape the elevator, toward the machine and place them on the elevator bar 3 thus retrieving them from loss.

Having therefore, described my invention, what I claim and desire to secure by Letters Patent, is:—

In a potato digger, the combination of a frame having a plow and an elevator adapted to dig and remove potatoes from a furrow; of wheels supporting said frame and operating said elevator; a roller mounted in a vertical plane on said frame; a series of gears operatively connecting said wheels to said roller, whereby the roller is rotated as the frame is moved forward; a second roller mounted at the front end of said frame and parallel to said first roller; a belt passing around both said rollers; teeth on the inner side of said belt and engaging in complementary cavities in said rollers, whereby said belt is driven by the rotation of said first roller and is maintained in axial position on both said rollers; and cleats extending from the outer surface of said belt and adapted to engage the sides of the furrow as they pass around said second roller, to push the potatoes therein towards the elevator in said frame.

TORIS H. LYNG.